(No Model.)

A. W. M. KEEN.
SADDLE.

No. 403,050. Patented May 7, 1889.

Witnesses:
W. E. Bowen
E. R. Brown

Inventor:
Arthur W. M. Keen
By Richards &
His Attorneys.

UNITED STATES PATENT OFFICE.

ARTHUR W. M. KEEN, OF MELBOURNE, VICTORIA.

SADDLE.

SPECIFICATION forming part of Letters Patent No. 403,050, dated May 7, 1889.

Application filed January 14, 1889. Serial No. 296,358. (No model.)

*To all whom it may concern:*

Be it known that I, ARTHUR WILLIAM MCLEOD KEEN, saddler, of Melbourne, in the Colony of Victoria, Australia, have invented certain new and useful Improvements in an Unbreakable and Light Metallic Racing and Riding Saddle Tree and Improved Panel; and I do hereby declare that the following is a full, clear, and exact description of the same, reference being made to the accompanying drawings, in which—

Figure 1:
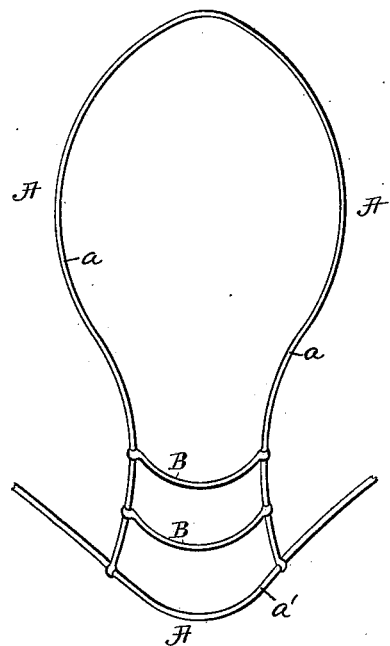
Figure 2:
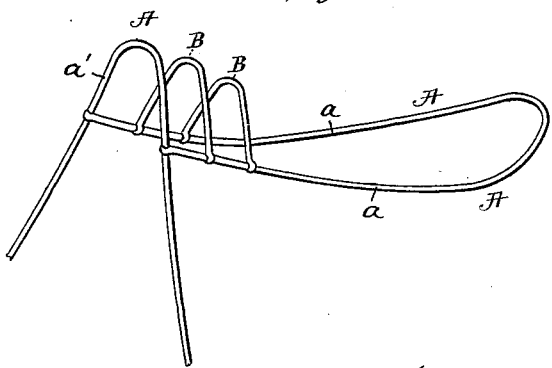

Figure 1 is a plan view of a saddle-tree embodying my invention, and Fig. 2 is a perspective view of the same.

The invention has for its object the construction of an unbreakable racing and riding saddle tree of stronger and yet lighter material than those used in the saddles now in use, also in considerably lessening the time and labor necessary to the making of racing and riding saddles.

To effect such purpose I make the tree or skeleton A A A of my improved saddle of a metallic structure, and that throughout. I construct the rim-piece $a$ of the same in one piece and use no other but metallic material in its construction. The said tree or framework is by such means rendered more pliable in character and lighter in weight, and yet quite unbreakable. I thus cure the faults of ordinary saddles, of which the tree is made of wood, pieced or lined with iron bracings secured onto same and always liable to breakage. To the rim-piece $a$, and in rear of the ordinary gullet or neck piece $a'$ of this saddle-tree, I clamp and braze two other gullet-pieces, B B, placed parallel to the first and an inch apart from that and from each other, for the purpose of binding and strengthening the tree.

The panel or inner covering of such tree is manufactured by me from one cutting of felt or spongy pile, as the tree is made of one piece of metal, such method of manufacture replacing the present form of panel-making in three layers of sheep-skin, serge, and flock, and greatly reducing the time and labor of manufacture.

What I claim as my invention, and desire to secure by Letters Patent, is—

In a riding-saddle, the herein-described elastic metallic tree, consisting of the rim-piece $a$, having at its forward end the main upright neck-piece $a'$, and a supplemental similarly-shaped upright neck-piece, B, situated in rear of and substantially parallel with said main neck-piece and secured at its lower ends to the rim-piece, substantially as specified.

Dated this 16th day of April, A. D. 1888.

A. W. M. KEEN.

Witnesses:
JAS. HINGSTON,
P. SCOTT.